Oct. 1, 1957 W. C. MORRISON 2,808,569

VIDEO TRANSMITTER

Filed Nov. 12, 1954

INVENTOR.
WENDELL C. MORRISON

BY Charles H. Brown

ATTORNEY

United States Patent Office 2,808,569

Patented Oct. 1, 1957

2,808,569

VIDEO TRANSMITTER

Wendell C. Morrison, Princeton, N. J., assignor to Radio Corporation of America, a corporation of Delaware Application November 12, 1954, Serial No. 468,297

6 Claims. (Cl. 332—37)

The invention relates to video transmitting systems, such as television transmitters, and particularly to the reduction of distortion in the modulated wave produced by and inherent in such systems.

Overall feedback circuits have been used successfully with aural transmitters to improve their characteristics. Such feedback circuits, however, have not been successfully applied to video (visual) transmitters because of the time delay involved in passing a signal through the transmitter. The time required for a signal to pass from the video input to the radio frequency (R. F.) output is not negligible compared to the time for one cycle of the highest video frequencies transmitted. As a result, a portion of the output signal fed back from the output of the visual transmitter does not provide correction when added to the input, but only spurious, delayed images.

An object of the invention is to improve the characteristics of a television transmitter.

Another object of the invention is to minimize distortion in a video transmitter arrangement by means of a feedback control circuit, the transmitter arrangement employing any desired number of stages in the overall arrangement.

A further object of the invention is to obtain a feedback control circuit for minimizing distortion in a video transmitter arrangement wherein a plurality of power output stages may be included.

According to one embodiment of the invention, the above objects are accomplished by driving a plurality of power amplifier stages in a video transmitter from a source of radio frequency energy, the output of the power amplifier stages then being coupled through a bridge to a suitable antenna or load device. A source of video signals is connected to a modulator, the output of the modulator serving to modulate the power amplifier stages in parallel by conventional means. A detector samples the signal at the output of the bridge. The detected sample which is of one polarity is fed from the output of the detector to a comparator. A sample of the video input signal is fed through an amplifier and delay means. The signal at the output of the delay means, which is of a polarity opposite to that of the detected sample, is then fed to the comparator to which is also fed the detected sample from the output of the bridge. Any difference signal resulting from the comparison of the two sample signals is fed as a control voltage to reactance control devices connected in the input circuit of the power amplifier stages and serving to control the output characteristics thereof. Any difference signal fed to the reactance control devices will affect the operation thereof and, therefore, that of the power amplifier stages. The output characteristics of the power amplifier stages will be changed in accordance with the difference or control signal present at the output of the comparator.

A more detailed description of the invention follows with reference to the accompanying drawing, wherein.

Figure 1:
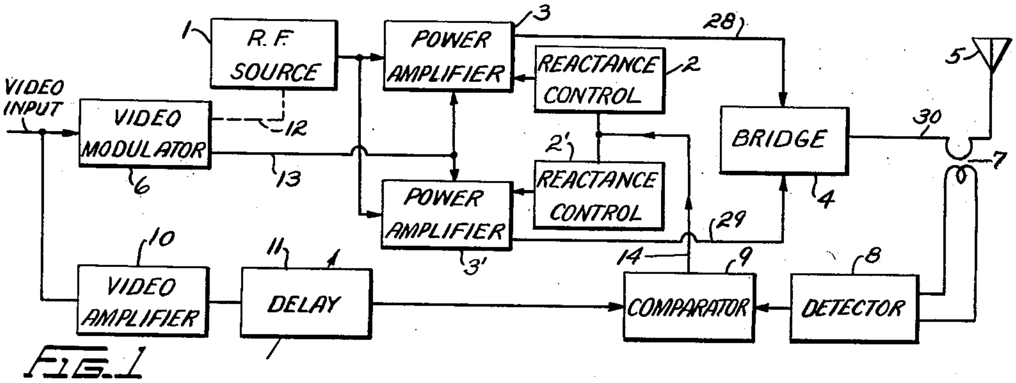
Fig. 1 is a block diagram of an embodiment of the invention.

Referring to Fig. 1, a source of radio frequency energy 1 is connected to two power output stages 3 and 3'. Also connected to the power output stages 3 and 3' are two reactance controls 2 and 2'. The reactance control may consist of reactance electron discharge devices which may be driven in push-pull or parallel depending upon whether they are both either inductive or capacitive in nature or one is inductive and the other is capacitive in nature. The output of reactance control 2 is connected to the grid of power amplifier stage 3, the output of reactance control 2' being connected to the grid of power amplifier 3'. The outputs from the two output stages 3 and 3' are fed to a bridge 4 where they are combined, and the resulting signal fed to a load device such as an antenna 5. The bridge prevents any undesirable interaction between the two power output stages and may be a diplexer of the type shown in Fig. 2. The outputs of the two output stages 3 and 3' are fed by coaxial lines 28 and 29, respectively, to a slotted diplexer. The two signals are diplexed and the output fed to the antenna 5 by coaxial line 30. While only two power output stages and a single bridge have been shown, $2^n$ such stages—where $n$ is any positive whole number—with a sufficient number of bridges connected thereto found to be desirable in a particular installation might be used to obtain a single signal output. By combining the outputs from a number of output stages, a power output of considerably greater value than that obtainable from a single stage is possible.

A video television signal is fed to a video modulator 6, and the output thereof is used to modulate the two power amplifier stages 3 and 3' in parallel over lead 13. If desired, the modulator could be used to modulate an earlier stage of the circuit such as the radio frequency energy source 1 by a conductor 12, shown as a dotted line, thus providing low level modulation rather than high level modulation.

A negative feedback control signal is obtained by sampling the output signal as at point 7 by use of a detector 8. The output of the detector 8 is fed to a comparator 9 which is also supplied with a sample of the video input signal. A portion of the video input signal is fed through an amplifier 10 and a time delay means 11. By the use of such amplifying and time delay means, the video input signal sample applied to the comparator 9 will be of the same amplitude and occur at the same time as the sample of the output signal supplied from detector 8, in the absence of any distortion of the output signal in the transmitting system. Any difference in the amplitudes of the two samples due to the distortion of the output signal is fed from the comparator 9 to the reactance control stages 2 and 2' as a control voltage of such magnitude and sense as to maintain the amplitude of the output sample the same as that of the video sample supplied to the comparator 9. By setting the initial phase between the two power amplifier stages so that somewhat less than a maximum power is produced, the carrier from each stage can then be either advanced or retarded in phase by the reactance control to make the amplitude of the detected output signal match the video input signal.

Figure 2:
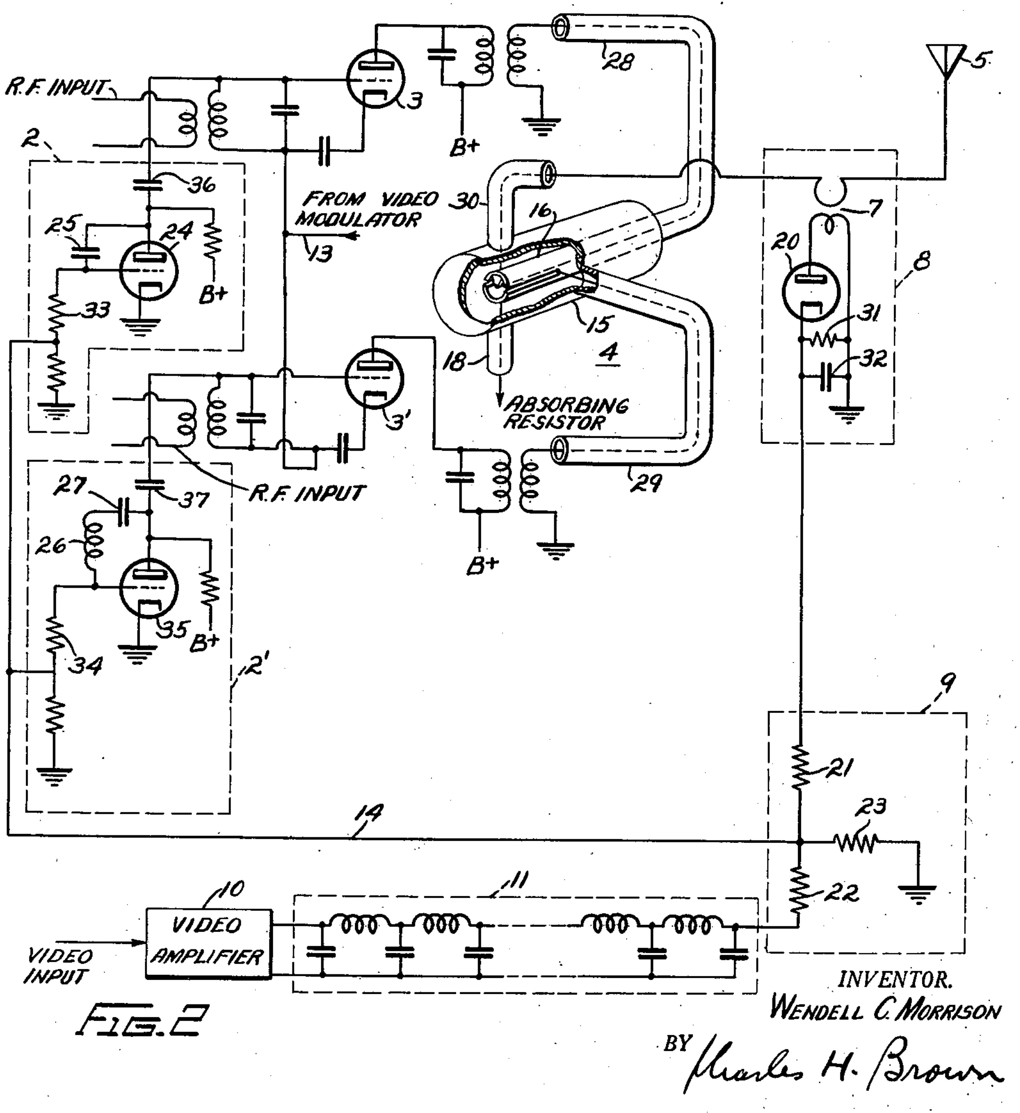
Fig. 2 is a circuit diagram of one form which the embodiment set forth in Fig. 1 may take.

In Fig. 2, which illustrates a circuit diagram of a form which the invention may take, a sample of the output signal is inductively coupled at point 7 to a detector 8, the signal being coupled between the anode of diode 20 and a point of reference potential such as ground. The cathode of the diode 20 is coupled by a resistive-capacitive circuit, 31 and 32, to a point of reference potential. The cathode of diode 20 is also connected to comparator 9 and serves to feed a positive sync-pulse sample of the output signal thereto. The comparator 9 comprises resistors 21, 22 and 23. Resistors 21 and 22 are of such value as to make each of the mixed signals equal in amplitude. The output of the diode 20 is fed across resistors 21 and 23 to a point of reference potential such as ground. A sample of the video input signal is fed to a video amplifier 10, through an inductive-capacitive variable delay line 11, and thereafter across resistors 22 and 23 of the comparator 9. The delay line 11 is of the proper value so as to delay the video input sample an amount such that the video signal sample will be applied to the comparator 9 at the same time that the corresponding output signal sample is applied to the comparator 9. The sample fed from the delay line 11 to the comparator 9 is of negative sync-pulse polarity. The output of the comparator 9 is coupled to reactance control stages 2 and 2' via lead 14, each of the reactance control stages comprising an evacuated electron discharge device 24 and 35, respectively. The inputs of the reactance control devices 24, 35 are in parallel relation relative to the feedback connection or lead 14. Reactance control stage 2 is capacitively coupled in the grid-anode circuit of discharge device 24 by capacitor 25 to produce an electronic capacitive reactance. Reactance control stage 2' is inductively coupled by an inductor 26 in the grid-anode circuit of discharge device 35 to produce an electronic inductive reactance. Capacitor 27 serves only to eliminate the D.-C. path from grid to anode of discharge device 35. A control or difference signal fed from the output of comparator 9 over lead 14 is resistively coupled to the grids of the discharge devices 24 and 35 by resistors 33 and 34, respectively, and serves to vary the voltage thereon. The output from the anode of discharge device 24 is coupled by capacitor 36 to the input circuit of power amplifier output stage 3, the output from the plate of discharge device 35 being coupled by capacitor 37 to the input circuit of power amplifier output stage 3'.

As pointed out above, the sample of the output signal fed to the comparator 9 from detector 8 will be positive in polarity while the sample of the video input signal fed to the comparator 9 from the delay line 11 will be negative in polarity. As these two voltages appear across resistors 21 and 22, respectively, they will tend to add. If the output signal is free of distortion, the sample of the output signal applied to resistor 21 will be of the same amplitude but of opposite polarity from that of the sample of the video input signal applied to resistor 22. A zero potential will then be present at the output of the comparator 9 assuming that both samples occur simultaneously. Under such circumstances there will be a zero control signal reistively coupled to the grids of reactance control stages 2 and 2'. If, however, the two samples differ in amplitude, a control voltage will result which will be representative of the variance. This control voltage is coupled to the grid of discharge devices 24 and 35 and, by so affecting the operation of the reactance control discharge devices, the output characteristics of the power output stages 3 and 3', which are controlled by the reactance control stages, will change in phase in such direction as to tend to match the amplitude of the output signal sample to that of the video signal sample. Any distortion of the output signal due to the normal operational characteristics of the power output devices and the circuit connected therewith will be minimized.

The outputs of the two power amplifier stages 3 and 3' are fed into two separate arms of a diplexer 4 by coaxial conductors 28 and 29, respectively. The diplexer 4 consists of a cylinder 15 along the center of which is positioned a slotted coaxial transmission line 16. The output from power amplifier stage 3 is coaxially fed into one end of the slotted line 16. The output from the second power amplifier stage 3' is coaxially fed to the diplexer and the slotted transmission line 16. A coaxial conductor 30 serves to couple the combined output from the two power amplifier stages 3 and 3' to an antenna 5. Reflected energy in the diplexer is fed by means of a coaxial conductor 18 to an absorbing resistor, not shown.

A simple negative feedback has been disclosed which will serve to correct distortion in a television transmitter. The outputs from each of the power output stages are combined in a bridge 4. Any error in the signal transmitted from any of the output stages due to distortion occurring therein will be combined at the output of the bridge 4 into a resultant error in the output signal fed to the antenna 5. The signal which may be in error is detected and fed back through a comparison means. Now, in order to compensate for the time delay incident to the passage of the video signal from the video input to the R. F. output and back to the comparator, the sample of the video signal fed to the comparator passes through a delay means. The sample video signal is given the same timing and amplitude as that of a distortionless signal appearing in the output of bridge 4. The delay means may be adjusted to compensate for any time delay brought about by any number of stages between the video input and R. F. output stages. By comparing the sample at the output of the detector 8 and that present at the output of time delay means 11, a control voltage is obtained which is an accurate representation of any error in the output signal. If there is no error, a zero control voltage will be present at the output of the comparator. Such a control voltage will be free from any undesirable effects such as are caused by inherent characteristics of the circuit, such as time delay.

Because the outputs of the two power amplifier stages serve to cancel or complement each other, the phase relation of the inputs thereto necessary to produce the desired output can be brought about by the use of the reactance control. If the initial phase between power amplifier stages is made so that somewhat less than maximum power is produced, the output can be increased or decreased to make the modulation envelope of the R. F. output match the video input. The control signal which is fed through the reactance controls serves to vary the phase characteristics of the signal output of the output stages. A controlled output is obtained which may automatically be maintained in accordance with the video input signal. With this system the modulation on the R. F. carrier is compared with the video input and forced to match it. In this sense the system is an overall feedback. However, the control is applied to the grids of the output stages so that while the gain inside the loop may be small, the time delay is also small.

Although it would be possible to correct the output signal by controlling only one power amplifier, this would produce undesired phase modulation of the output carrier which can, for identical power amplifier stages, be avoided by dividing the required phase shift between the two amplifiers.

By means of the invention a simple control circuit has been provided for use in video transmitters for automatically correcting distortion in the R. F. output as compared to the video input. Most important, such an arrangement is useful with a plurality of stages, including power output stages, the arrangement avoiding the transmission of ghosts or spurious images such as would normally be the case due to time delay inherent in the circuit.

What I claim is:

1. In a video transmitting system including a plurality of video modulated power amplifier stages, said amplifier stages feeding into a common bridge, a load device coupled to the output from said bridge, a feedback control circuit comprising, in combination, a comparator, means for detecting a sample of the output signal from said bridge and feeding said detected sample to said comparator, means for deriving a sample of the video input signal and feeding same to said comparator, means for delaying said video input signal sample, reactance control means connected to said power amplifier stages, means for feeding the output from said comparator resulting from a difference in the amplitude of the samples supplied thereto to said control means, whereby the output characteristics of said amplifier stages will be varied in accordance with said difference.

2. In a video transmitting system as claimed in claim 1, means for varying the amount of delay in said delay means.

3. In a video transmitting system including a plurality of video modulated power amplifier stages, said amplifier stages feeding into a slotted diplexer, an antenna coupled to the output from said diplexer, a feedback control circuit comprising, in combination, a comparator, means for detecting a sample of the output signal from said diplexer and feeding said detected sample to said comparator, means for deriving a sample of the video input signal and feeding same to said comparator, means for delaying said video input signal sample, means for adjusting the amount of delay in said delay means, reactance control means connected to said power amplifier stages, means for feeding the output from said comparator resulting from a difference in the amplitude of the samples supplied thereto to said control means, whereby the output characteristic of said amplifier stages will be varied in accordance with said difference.

4. A video transmitter comprising power amplifier stages having their inputs in electrically parallel relation, means for applying carrier frequency energy to the inputs of said stages, means for applying video energy to the inputs of said stages, a bridge having different arms connected to the respective outputs of said stages, a control device individual to each of said stages, a detector coupled to the output of said bridge, an amplitude comparator coupled to the outputs of said stages through said detector and to said second means through a delay circuit, and a circuit coupling the output of said comparator to said control devices.

5. A video transmitter comprising power amplifier stages having their inputs in electrically parallel relation, means for applying carrier frequency energy to the inputs of said stages, means for applying video energy to the inputs of said stages, a control device individual to each of said stages, a detector coupled to and responsive to energy representative of the output of said stages, an amplitude comparator coupled to the output of said detector and through a delay circuit to said second-mentioned means, and means for feeding the output from said comparator resulting from a difference in the amplitudes of the signals supplied thereto by said detector and said delay circuit to said control devices.

6. A video transmitter comprising a power amplifier stage, means for applying carrier frequency energy to the input of said stage, means for applying video energy to the input of said stage, a control device connected to said stage, a detector coupled to and responsive to energy representative of the output of said stage, an amplitude comparator coupled to the output of said detector and through a delay circuit to said second-mentioned means, and means for feeding the output from said comparator resulting from a difference in the amplitudes of the signals supplied thereto by said detector and said delay circuit to said control device.

References Cited in the file of this patent

UNITED STATES PATENTS

| | | |
|---|---|---|
| 2,172,453 | Rose | Sept. 12, 1939 |
| 2,298,930 | Decino | Oct. 13, 1942 |
| 2,429,649 | Romander | Oct. 28, 1947 |
| 2,610,297 | Leed | Sept. 9, 1952 |